E. T. Gilliland.
IMPROVEMENT IN DIAL TELEGRAPHS.
No. 116430. Patented Jun 27 1871.
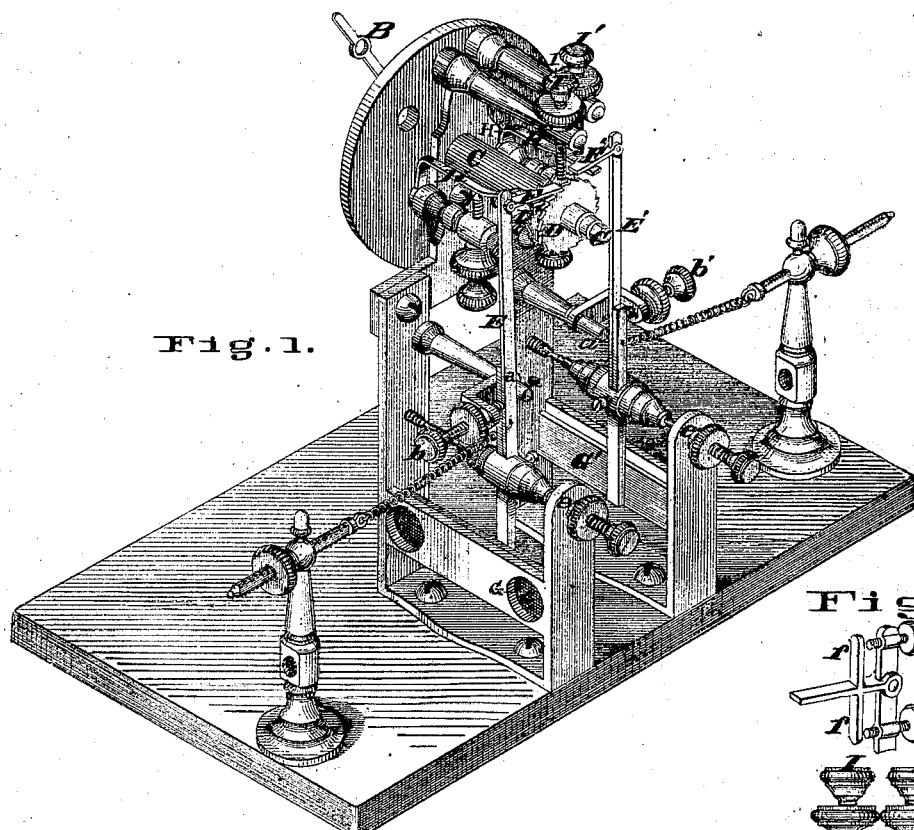
Fig. 1.
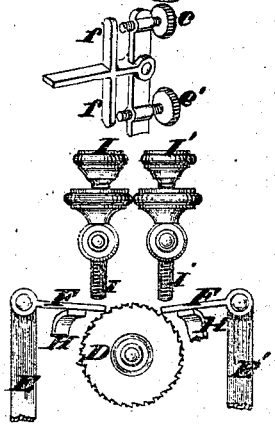
Fig. 3.
Fig. 4.
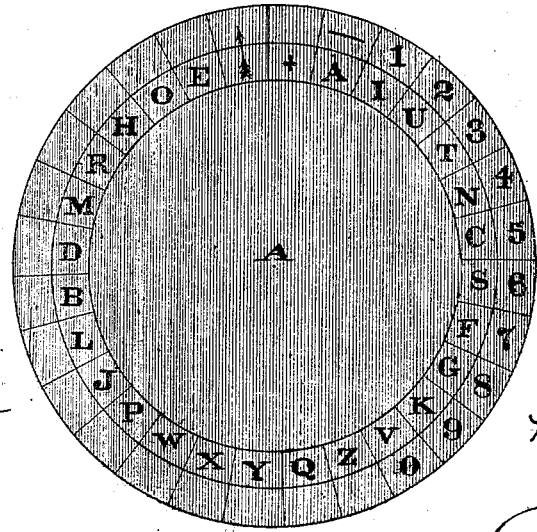
Fig. 2.
Attest.
Edw. J. Eils
F. Clausen
Inventor.
E. T. Gilliland
By F. Millward
Attorney

UNITED STATES PATENT OFFICE.

EZRA T. GILLILAND, OF CINCINNATI, OHIO, ASSIGNOR TO HIRAM D. ROGERS, OF SAME PLACE.

IMPROVEMENT IN DIAL-TELEGRAPH INSTRUMENTS.

Specification forming part of Letters Patent No. 116,430, dated June 27, 1871.

*To all whom it may concern:*

Be it known that I, EZRA T. GILLILAND, of Cincinnati, Ohio, have invented certain new and useful Improvements in Dial-Telegraphs, of which the following is a specification:

My invention relates to that class of electro-magnetic telegraphs which embodies a dial and revolving pointer or finger; and consists in the peculiar construction and arrangement of the pawls, ratchet-wheels, and pointer-shaft, by which the pointer can be rotated in either direction and not permitted to move more than one direction of the dial at each movement of either pawl, or permitted to fail in moving the required single division of the dial for each movement of either pawl.

In the accompanying drawing, Figure 1 is an isometric perspective view with the dial detached. Fig. 2 is a view of the face of the dial, illustrating the peculiar arrangement of the letters. Fig. 3 is a modification of the pawl device. Fig. 4 is a full-sized elevation of the preferred arrangement of the pawls and stopping devices.

A is the dial-plate; B, the pointer or finger; and C, the pointer-shaft to which the ratchet-wheels D D' are secured. The notches in the ratchets are cut, as shown, in reverse directions, in order to provide for the movement of the pointer B in either direction. The wheels D D' are operated by the pawl-arms E E' and pawls F F', the arms being pivoted at e e' and carrying the customary armatures G G' of electro-magnets.

In the attachment and operation of this instrument two separate lines may be used to give the pointer the reverse directions; or a single line may be used in connection with a polarized relay-magnet. The vibration of the pawl-arms is limited by stops 22' and set-screws b b'. The pawls F F', when withdrawn from the ratchet-wheels, are supported on the adjustable projections H H, in order that one may not interfere with the action of the other, or, in other words, that one pawl may not prevent the rotation of the pointer by the action of the other. In order to prevent the rotation of the pointer over more than one division of the dial-plate for each movement of the arm E or E', the adjustable stops I I are provided, against which the pawls impinge when the finger has been moved the prescribed distance. The effect of this impingement is that the pawl is forced down upon the ratchet-wheel tightly, and the shaft and pointer are prevented from bounding forward by momentum. Substantially the same result is accomplished by the device exhibited in Fig. 3, wherein the arm E is fitted with set-screw stops c c, against which the projections f f' of the pawl F infringe.

In the transmission of messages by this instrument the pointer receives an intermittent rotation over the dial-plate, in the manner described; and in order to avoid unnecessary movement of the pointer and provide for the rapid transmission of messages, I arrange the alphabet on the dial-plate in the manner exhibited in Fig. 2, the letters being arranged in the order of value or frequency of use in both directions from the starting point, the vowels, of course, being first, and the consonants following in the order of merit, as shown.

I claim as my invention—

1. In connection with the dial-plate pointer and shaft, the pawl-arms E E', pawls F F', and ratchet-wheels D D', combined and operating to move the pointer in either direction, substantially as described.

2. The adjustable stops H H' I I', or their equivalents, substantially as described, to limit the motion of the pawls.

In testimony of which invention I hereunto set my hand.

E. T. GILLILAND.

Witnesses:
 GEO. H. KNIGHT,
 JAMES H. LAYMAN.